March 9, 1954　　　E. P. BULLARD III　　　2,671,861
MATERIAL-HANDLING APPARATUS AND CONTROL THEREFOR
Filed July 9, 1949　　　　　　　　　　　　　　　　4 Sheets-Sheet 1
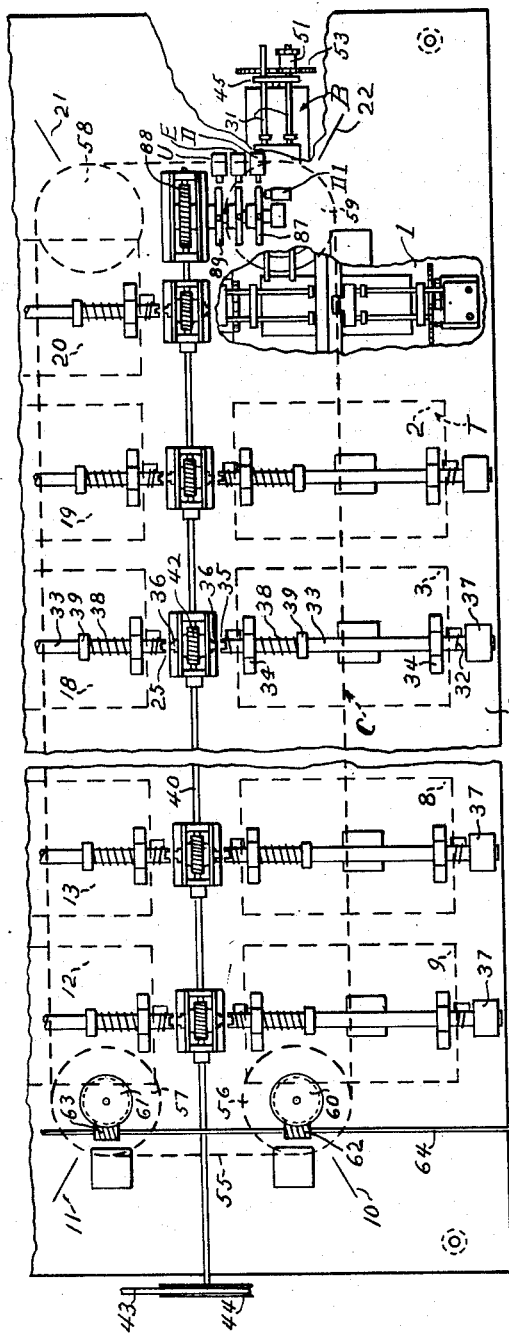
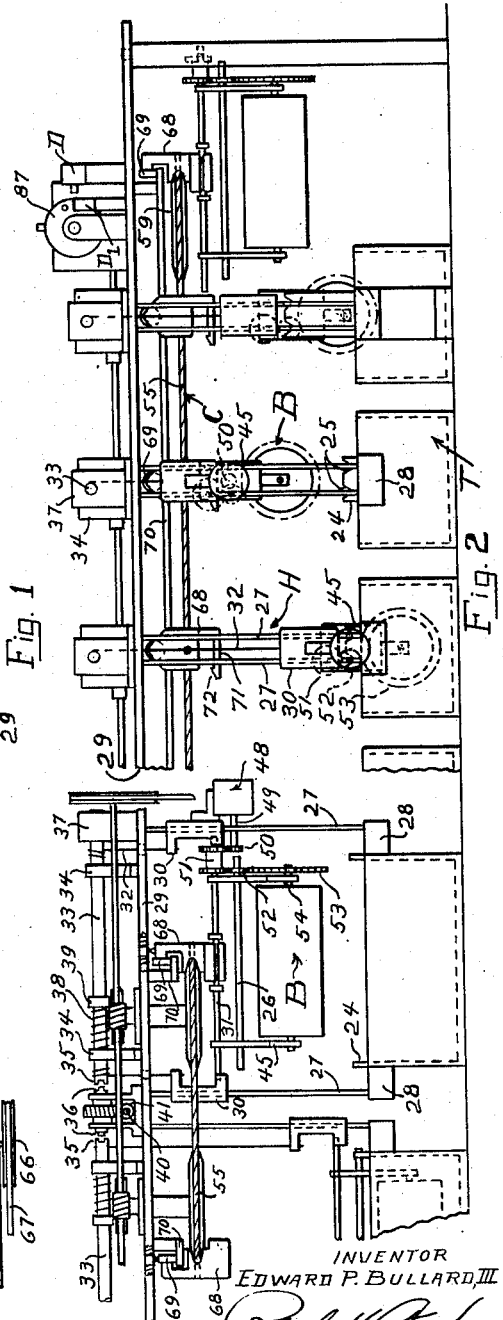
INVENTOR
EDWARD P. BULLARD, III
ATTORNEY March 9, 1954     E. P. BULLARD III     2,671,861
MATERIAL-HANDLING APPARATUS AND CONTROL THEREFOR
Filed July 9, 1949     4 Sheets-Sheet 2
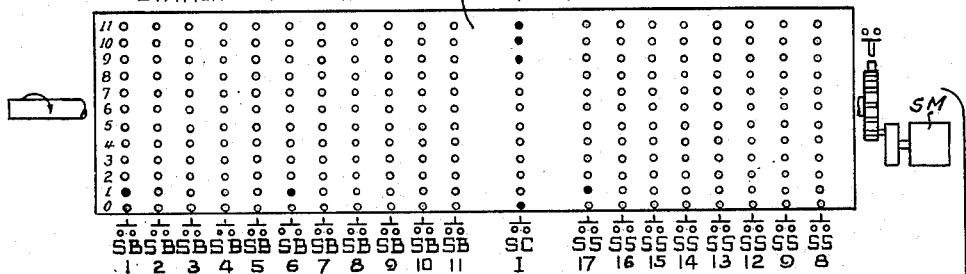
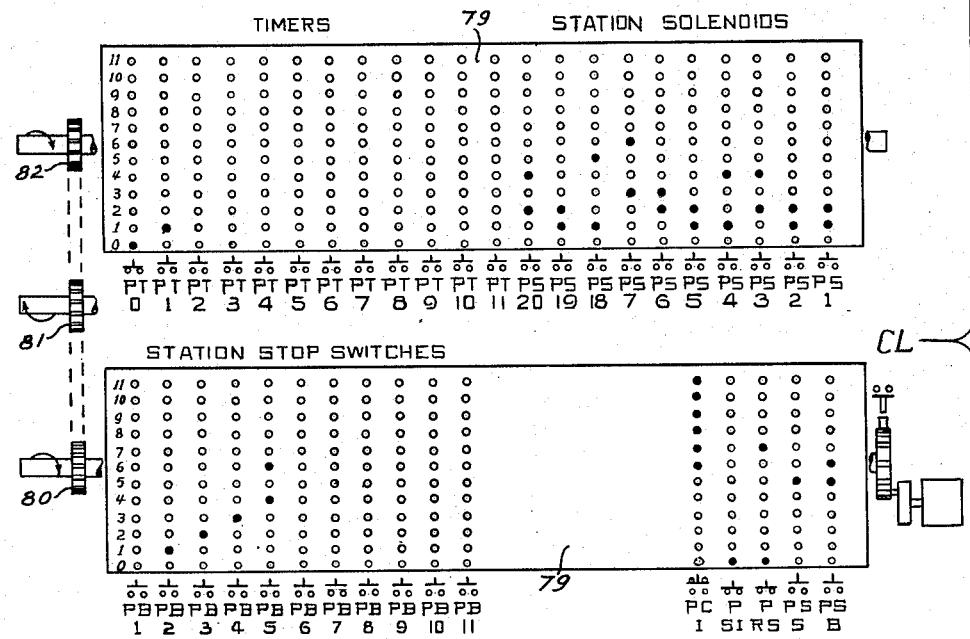
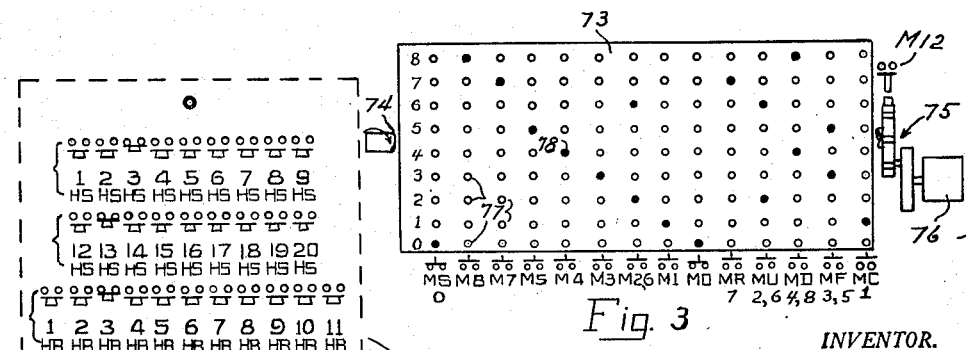
INVENTOR.
*Edward P. Bullard, III*
BY
*Paul M. Grist*
ATTORNEY March 9, 1954  E. P. BULLARD III  2,671,861
MATERIAL-HANDLING APPARATUS AND CONTROL THEREFOR
Filed July 9, 1949  4 Sheets-Sheet 4

INVENTOR.
EDWARD P. BULLARD, III
BY
ATTORNEY

Patented Mar. 9, 1954

2,671,861

UNITED STATES PATENT OFFICE 2,671,861

MATERIAL-HANDLING APPARATUS AND CONTROL THEREFOR

Edward P. Bullard III, Fairfield, Conn., assignor to The Bullard Company, a corporation of Connecticut Application July 9, 1949, Serial No. 103,823

9 Claims. (Cl. 307—115)

1

This invention relates to material-handling apparatus, and particularly to a new and improved conveyor and control therefor. Although the principles of that portion of the invention relating to the control are applicable to any apparatus wherein a cycle of sequential functions is to be performed, it will be shown and described as applied to material-handling apparatus of the conveyor type.

An object of this invention is to provide an apparatus capable of a great number of different functions, and a control for the apparatus which will automatically cause the apparatus to perform any of the functions in a cycle of operations.

Other objects include the provision of a material conveying apparatus wherein there is combined hoisting conveyor mechanism and independent translating conveyor mechanism so controlled that their functions jointly serve to provide an extremely versatile material-handling apparatus; the provision of such apparatus in which independently controlled hoisting mechanism is provided at each of a plurality of stations between which work is to be transferred, and an endless belt conveyor is provided to cooperate with the hoisting mechanism to effect the desired transfer of work; the provision of such an apparatus in which work can be transferred from any one or more such stations and regardless of whether there is work at said other stations; the provision of an automatic control for any apparatus capable of producing a series of operations in sequence in which a master control can be pre-set to cause the apparatus to produce any series of operations of which the apparatus is capable and other pre-settable control structure is provided that will vary any of the functions of the master control in succeeding series of operations controlled by it; the provision of an automatic control wherein a series of sequential operations can be modified each time the series is performed so as to produce a cycle of operations involving a plurality of series of operations in each of which one or more operations may be modified; and the provision of a material-handling system involving an endless belt conveyor, hoists at a plurality of stations in cooperating relation with the endless belt, and a combined automatic, semi-automatic and manual control for causing said hoists and conveyor to transfer work between any of the plurality of stations independently of all others, and regardless of whether there is work at the other stations.

2

The above, as well as other objects and novel features of the invention will become apparent from the following specification and accompanying drawings, in which:

Figure 1 is a top plan view of material-handling apparatus to which the principles of the invention have been applied;

Fig. 2 is a side elevational view of the apparatus shown in Fig. 1;

Fig. 3 is a developed disclosure of part of the control mechanism for the apparatus shown in Figs. 1 and 2;

Fig. 6 is a disclosure of the panel board for manual control of the apparatus.

Although the principles of the invention may be applied with equal facility to any apparatus capable of producing a plurality of functions in sequence, it is shown and will be described as applied to an apparatus for treating work prior to, during, and after a plating operation.

Figure 5:
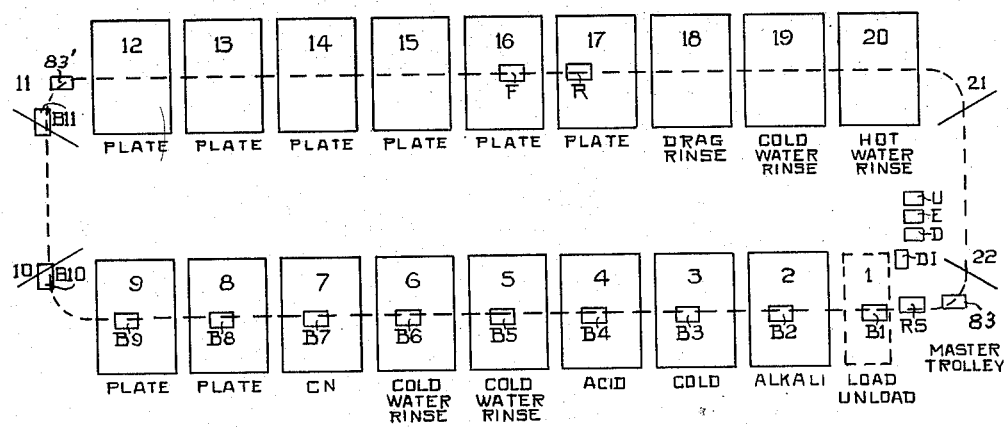
Fig. 5 is a schematic diagram showing the plurality of stations of Figs. 1 and 2.

Referring to Figs. 1, 2 and 5, twenty-two stations numbered 1 to 22, inclusive, are arranged in a horizontal plane over which an endless belt conveyor C is adapted to pass. Tanks T are located at each station except stations 1, 10, 11, 21 and 22. Station 1 is the loading station, while stations 10, 11, 21 and 22 are idle stations at which no treatment of the work takes place.

Hoists H (Fig. 2 are located at each station, except the idle stations above mentioned, for raising and lowering barrels B that hold the work to be treated.

A control mechanism CL (Fig. 3) is provided for causing the sequential operation of the conveyor C and the hoists H to transfer barrels B from certain tanks T to other predetermined tanks in a predetermined cycle of operations.

Stations 1 to 9 inclusive are in spaced, aligned relation with stations 20 to 12, respectively. Each of these stations, except 1, has a tank T of generally rectangular construction and formed in a manner to contain the bath to which the work in barrels B is to be subjected. Each tank T is provided with supporting blocks 24 at the ends thereof in aligned relation. The blocks 24 include V-slots 25 adapted to receive a pair of parallel supporting rods 26 associated with the barrels B.

The hoists H at each station, except 10, 11, 21 and 22, are identical and only one will specifically be described. Pairs of guide rods 27 extend between supports 28 on opposite ends of the tanks T and a super structure 29 overlying all of the tanks T. C-shaped slides 30 ride on the guide rods 27 and are adapted to engage extended end portions of lift rods 31 located above the supporting rods 26. Each slide 30 is provided with a cable 32 that extends upwardly through the super structure 29 and is attached to one end of a rotatable shaft 33 journaled in bearings 34 on the upper side of the structure 29. The one end of each shaft 33 is provided with a toothed clutch 35 adapted to mesh with a mating portion 36 located between aligned shafts 33 of aligned stations, such as 3 and 18. An electro-magnet 37 is provided at the end of each shaft 33 opposite its clutch end, and a spring 38 between bearing 34 and a collar 39 normally urges shaft 33 in a direction to disengage clutch 35, 36. Each of the clutch portions 36 between aligned stations is driven by a common drive shaft 40 through a worm 41 and a worm gear 42. The shaft 40 is driven from a motor (not shown), a belt 43 and pulley 44. Energization of any one or more of the solenoids 37 causes the respective shafts 33 to be shifted, engaging clutches 35, 36 and thereby causing slides 30 to be raised or lowered depending upon the direction of rotation of the shaft 40.

The barrels B may be of any desired design, and even may be individual racks for supporting the work to be treated. In the embodiment shown, the barrels B are rotatable and are journaled in the lower end of T-shaped supports 45. The upper horizontal portions of these supports locate the two pairs of parallel spaced rods 26 and 31. The rods 26 are adapted to register with the V's 25 in the blocks 24; while the rods 31 are adapted to seat within the V's in the hoist slides 30. In order to provide rotation of the barrels B at all times, except while moving from station to station, a motor and reduction gear unit 48 is fixed to one of each pair of slides 30 at all stations except station 1, there being no hoist devices at stations 10, 11, 21 and 22.

A drive shaft 49 of the unit 48 is provided with a spur gear 50 that meshes with one of an idle cluster 51, the other of which cluster meshes with an idler gear 52 journaled on rod 26. Gear 52 meshes with a drive gear 53 keyed to the trunnion 54 of barrel B. The construction is such that whenever the barrel B is supported through the rods 31 by the slides 30, gears 50 and 51 are in mesh and motor 48 rotates the barrel B. The motors 48 are provided with flexible conduits to permit their continuous operation regardless of the elevation of the slides 30.

The endless belt conveyor C comprises in the present embodiment a cable 55 that passes around four grooved pulleys 56, 57, 58 and 59 located in a horizontal plane just below the super structure 29. The pulleys 56 and 57 are fixed to worm gears 60 and 61, respectively, which mesh with worms 62, 63, keyed to a drive shaft 64. One end of shaft 64 has keyed to it a drive pulley 66 driven through a belt 67 by an electric motor (not shown). At equally-spaced intervals about the cable 55, hooks 68 are attached. The spacing of the hooks 68 is equal to that of the stations 1 to 22. Each hook 68 comprises a trolley wheel 69 adapted to ride on a track 70 attached to the under-side of the structure 29 and following the path of the belt 55. Hooks 68 include a horizontally-arranged arm 71 that is provided with a nose 72 to retain rods 31 when they are deposited upon the arm 71.

The control mechanism CL, shown in developed form in Fig. 3, comprises a master drum 73 adapted to be indexed about a horizontal axis 74 in a step-by-step fashion by a Geneva stop mechanism 75 that is powered by a motor 76. The master drum includes a plurality of portions, in the present instance numbered 0 to 8, each of which embodies a series of apertures 77 in aligned relation parallel to the axis of rotation of drum 73. Switch-closing dogs 78 are adapted to be fastened to drum 73 in selected relation to cause the apparatus previously described to produce a plurality of functions in sequence. The series of operations performed by the apparatus in accordance with the setting of the master drum 73 is adapted to be modified by the pre-setting of a primary drum 79 which is similar to drum 73. The primary drum 79 is shown in two parts geared together by spur gears 80, 81 and 82. Each part includes portions 0 to 11, and each portion includes a plurality of aligned apertures parallel to the axis of rotation of the respective part.

Figure 4:
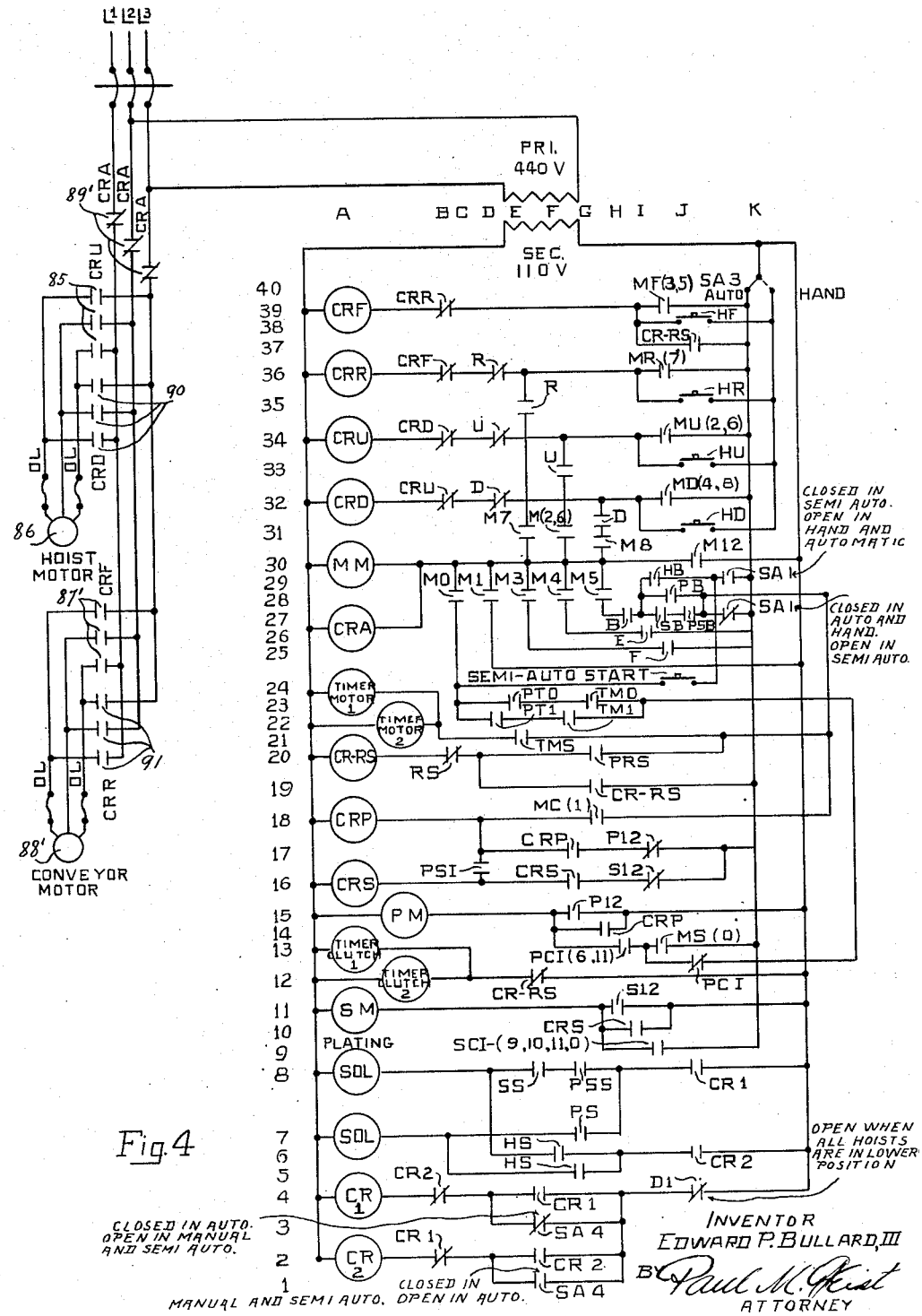
Fig. 4 is the electrical diagram for the control mechanism of Fig. 3.

One of the modifications of the series of operations of the master drum 73, in the present embodiment, is effected by the switches PB1 to PB11 which are wired in series arrangement with corresponding switches B1 to B11 located at stations 1 to 11 (Fig. 5) for the purpose of stopping the belt conveyor at any predetermined station 1 to 22. Only eleven PB switches are required since two master trolley switch operators 83, 83' are arranged equi-distant on the endless belt 55. Accordingly, when master trolley 83 is at station 11, master trolley 83' is at station 1. So, a master trolley will always be in position to stop the conveyor at any of the twenty-two stations while employing only eleven switches. Only one PB and one B switch is shown in the diagram of Fig. 4 for clarity. Actually there are eleven PB switches in parallel and eleven B switches in parallel.

Another modification of the cycle of the master drum is effected by switches PS1 to PS7 and PS18 to PC20, both inclusive, which switches energize selected solenoids 37 for engaging predetermined clutches 35, 36. In Fig. 4, only one PS switch is shown for clarity, although there are actually ten such switches in parallel. The PT0 to PT11 switches of the primary drum are employed to determine the time limit between successive complete revolutions of the master drum 73. In Fig. 4, only two PT switches are shown for clarity. The remaining switches associated with the primary drum 79 are for purposes to be described later.

The combination of the master drum and primary drum produces a cycle of operations of the conveyor apparatus in which for each of the twelve positions of the primary 79, the master drum 73 indexes from position 0 to 8, back to 0 again. And, in each rotation of the master drum 73 predetermined barrels B at predetermined stations of the apparatus are moved to predetermined other stations of the apparatus.

Should it be desired to modify any of the operations of the apparatus caused by the pre-setting of the PB or PS switches of the primary drum 79 to produce a still larger cycle of operations than that described, say, for example, one which involves such a modification for each succeeding revolution of the primary drum 79, a secondary drum 84 may be employed that is similar to the primary drum 79. The SB1 to SB11 switches of drum 84 are in parallel with the PB1 to PB11 switches; while the SS switches 8, 9, 12, 13, 14, 15, 16 and 17 energize selected solenoids 37 in the same manner that the PS switches of drum 79 energize selected other solenoids 37. In the diagram of Fig. 4 only one SB and one SS switch is shown for clarity, although there are actually eleven SB switches in parallel, and eight SS switches in parallel.

In the present embodiment a cycle of operations requiring the secondary drum 84 will be described in which the modification of the operations set up on the primary drum 79 includes transferring work between tanks T at stations 8, 9, 12, 13, 14, 15, 16 and 17.

Of course, it is entirely within the scope of this invention to employ any number of additional drums such as drum 84 to still further modify and enlarge the desired cycle of operations. For example, a tertiary drum may be employed that could modify one or more operations set up on the primary and secondary. It is obvious, therefore, that any cycle of operations can be controlled regardless of the number of independent operations therein, and that the number of controllable operations increases as the square with each additional control drum similar to 84.

The electrical portion of the control CL can best be understood from a description of an exact cycle of operations of the apparatus set up on the drums 73, 79 and 84. Let it be assumed that a continuous cycle of operations is desired in the electroplating of work carried in the barrels B as follows:

| Station No. | Treatment | Time (Minutes) |
| --- | --- | --- |
| 1 | Load and Unload | |
| 2 | Alkali | 4 |
| 3 | Cold Water Rinse | 2 |
| 4 | Acid Bath | 2 |
| 5 | Cold Water Rinse | 4 |
| 6 | do | 2 |
| 7 | Cyanide Bath | 2 |
| 8 | Plating | 72 |
| 9 | do | 72 |
| 10 | Idle | |
| 11 | do | |
| 12 | Plating | 72 |
| 13 | do | 72 |
| 14 | do | 72 |
| 15 | do | 72 |
| 16 | do | 72 |
| 17 | do | 72 |
| 18 | Drag Out Rinse | 2 |
| 19 | Cold Water Rinse | 4 |
| 20 | Hot Water Rinse | 2 |
| 21 | Idle | |
| 22 | do | |

In order to maintain a continuous cycle of operations as above outlined, it is evident that work must be transferred from one station to the next adjacent, say from stations 1, 2, 3, 4, 5, 6, 18, 19 and 20 to stations 2, 3, 4, 5, 6, 7, 19, 20 and 21, respectively; and, from one station to other stations at varying distances such as from stations 7 to 8; 7 to 9; 7 to 12, etc. The first of these operations can easily be accomplished by the master drum 73 and primary drum 79; while the latter require the interaction of the secondary drum 84.

At the beginning of the cycle to be illustrated, an empty barrel B is placed in the tanks T at stations 4, 8, 9, 12, 13, 14, 15, 16, 17 and 18; one is attached to the conveyor C at station 21, and a barrel at the loading station 1 is filled with work. Referring to Fig. 4, the numbers on the left and the letters at the top will be employed in parentheses throughout the following text to assist in locating the various components.

The electrical circuit shown in Fig. 4 is of the "across the line" type for purposes of simplicity. The circles shown in Fig. 4 represent the coils of relays, the short spaced parallel lines represent normally open switches, and the short parallel spaced lines with a diagonal line therethrough represent normally closed switches. The designation in the circles correspond to similar designations of certain of the switches. When a circuit is established through one of the circular relays, all switches having the same designation are caused to operate. Thus, energization of the relay CR2 (2, A) will cause the opening of CR2 switch (4, B); the closing of CR2 switch (2, E); and the operation of all other CR2 switches within the circuit.

With master trolley 83 (Fig. 5) at the loading station, and switch SA-3 (40, K) in "Auto" (Fig. 4), RS switch (20, B) is open and relay CR—RS (20, A) is de-energized. Accordingly, CR—RS switch (12, E) is closed and timer clutch relays 1 and 2 (13, 12, A) are energized which closes TMS switch (21, E). This energizes the timer motors 1 and 2 (24, 22, A). Timer 1 has circuits 0–5; while timer 2 has circuits 6–11. Each circuit can be set for the duration of a treatment in the process. Since the 0 circuit for timer 1 is the first to be energized, TMO switch (23, G) closes. PTO switch (23, E) is closed by a dog at position 0 of the primary drum 79 (Fig. 3), and switch MS(O) (13, I) and switch MO (28, B) are closed by dogs at position 0 of the master drum 73. Accordingly, motor MM (30, A) is energized, indexing the master drum 73 to position 1. This indexing closes switch M12 (30, J) (Fig. 3), holding MM energized after switch MO (28, B) opens due to indexing of master drum 73 from its 0 position. Although there are ten PT and ten TM switches numbered 0–10 respectively, only two of each are shown in Fig. 4 for clarity.

At position 1 of master drum 73, a dog closes MC(1) switch (18, G), thereby energizing CRS relay (16, A) since a dog at position 0 of the primary 79 closes PS1 switch (16, C). Energizing CRS relay closes CRS switch (10, H) thereby energizing motor SM (11, A). Energizing SM (11, A) indexes the secondary drum 84 to its position 1. However, position 1 of the secondary drum is not active until position 5 of the primary 79 is reached, as will be described later.

Closing MC(1) switch (18, G) also energizes relay CRP (18, A) which closes switch CRP (14, G) starting the primary motor PM (15, A) which indexes the primary drum 79 to position 1. Also, energization of relay CRP closes CRP switch (17, F) which holds relay CRS energized as the master drum 73 indexes to its position 2, and before the primary 79 indexes to its position 1.

Figure 7:
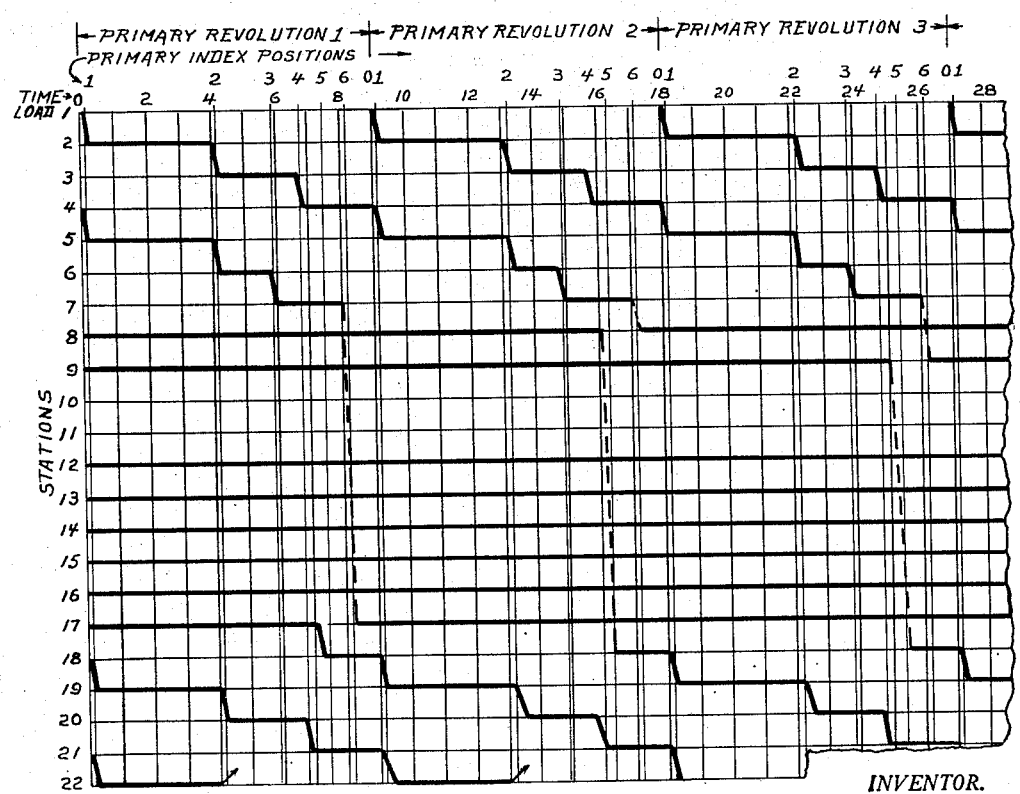
Fig. 7 is a diagram of part of the cycle of operations.

Referring to Fig. 7 in which a small portion of the cycle of operations is shown diagrammatically, the abscissa axis represents time in minutes, while the ordinate axis represents stations. This diagram will facilitate an understanding of the relation of the various operations to each other in the cycle.

Position 1 of the primary is to be set to cause transferring of the loaded barrel B at station 1 to station 2; the empty barrel at station 4 to station 5; the empty barrel at station 18 to station 19; and the empty barrel at station 21 to station 22. Accordingly, dogs are attached to the primary drum at its position 1 to close switches PS1, PS2, PS4, PS5, PS18 and PS19 (7, F). As set forth before, only one PS switch is shown for clarity. Actually, in the present embodiment there are ten PS switches in parallel numbered PS1, PS2, PS3, PS4, PS5, PS6, PS7, PS18, PS19 and PS20 (see Fig. 3). There are no switches PS21 and PS22 since there are no tanks or hoists at these stations. Closing of switches PS1, PS2, PS4, PS5, PS18 and PS19 (7, F) would energize the solenoids 37 (7, A, Fig. 4) that cause engagement of the hoist clutches 35, 36 for stations 1, 2, 4, 5, 18 and 19, except that switch D1 (4, J) is open when all the hoists are down, or in their lower positions.

A dog at position 1 of the master drum 73 closes switch M1 (28, D) causing motor MM (30, A) to be energized, thereby indexing master drum 73 to position 2. Of course, M12 (30, J) closes again to complete the index. At position 2 of the master drum, a dog closes MU(2, 6) switch (34, J) energizing CRU relay (34, A) which in turn closes CRU switches 85 in the line for the hoist motor 86, causing the hoist motor to rotate thereby driving belt 43, pulley 44, shaft 40 and a cam 87 that closes D1 switch (4, J). Closing D1 switch energizes CR1 relay (4, A) which in turn closes CR1 switch (8, J) and holding-switch CR1 (4, E). Closing CR1 switch (8, J) passes current through the PS1, PS2, PS4, PS5, PS18 and PS19 switches, causing the hoist clutches 35, 36 at stations 1, 2, 4, 5, 18 and 19 to engage. The hoists H at these stations then rise. The cam 87 is rotated by a worm gear 88 that is driven by a worm on shaft 40. At the top of the hoist movement, switch U (33, F) closes and switch U (34, D) opens. Referring to Fig. 1, a cam 89 is pre-set and driven by worm gear 88 so that at the top of the travel of hoists H, switches U are simultaneously operated. Opening switch U (34, D) de-energizes relay CRU (34, A) which in turn opens switches CRU 85 in the hoist motor circuit, stopping the upward movement of the hoists H at stations 1, 2, 4, 5, 18 and 19. Closing switch U (33, F) energizes motor MM (30, A) since M(2, 6) switch (31, F) and MU(2, 6) switch (34, J) are closed by dogs at position 2 of the master drum 73. Accordingly, the master drum is indexed to position 3.

MF(3, 5) switch (39, I) is closed by a dog at position 3 of the master drum, energizing CRF relay (39, A) which in turn closes CRF switches 87' in the circuit for the conveyor motor 88', causing it to move the conveyor C forwardly until switch F (25, I) closes. Switch F (Fig. 5) is so located that it stops the conveyor C when the hooks 68 are in position to receive rods 31 upon the partial lowering of hoists H.

Switch M3 (28, D) is closed by a dog at position 3 of the master drum 73 so that when switch F (25, I) closes, relay CRA (27, A) is energized opening the CRA switches 89' in the main circuit, stopping the conveyor motor 88'. Also master motor MM (30, A) is energized indexing the master drum 73 to position 4.

MD(4, 8) switch (32, J) closes by a dog at position 4 of the master drum 73, energizing relay CRD (32, A) which in turn closes CRD switches 90 in the circuit for the hoist motor 86, causing the hoists H at stations 1, 2, 4, 5, 18 and 19 to lower until switch E (26, I) closes. Since switch M4 (28, F) is closed by a dog at position 4 of the master drum 73, relay CRA (26, A) is energized when switch E (26, I) closes. Energizing CRA relay opens the CRA switches 89' in the main circuit, stopping the hoist motor 86 with the hoists low enough to have deposited the barrels B from stations 1, 4 and 18 onto the conveyor hooks 68 at each of said stations, there being no barrels on hoists 2, 5 and 19. These hoists remain in this partial down position until a later period to be described.

Closing of the E switch (26, I) also energizes motor MM (30, A) since switch M4 (28, F) is closed by a dog at position 4 of the master drum 73. Accordingly, the master drum indexes to position 5.

MF(3, 5) switch (39, I) closes by a dog at position 5 of the master drum 73, energizing relay CRF (39, A) which in turn closes CRF switches 87' in the circuit for the conveyor motor 88', causing the conveyor C to move forwardly carrying the barrels at stations 1, 4, 18 and 21 to stations 2, 5, 19 and 22, respectively, until the B2 switch (27, H) at station 2 closes. In Fig. 4 only one B switch (27, H) is shown for clarity. Actually there are eleven such switches in parallel, identified as B1 to B11, inclusive (see Fig. 5). Since the PB2 switch (23, J) for station 2 is closed by a dog on the primary drum 79 at its position 1, and M5 switch (28, G) is closed by a dog at position 5 of the master drum 73, CRA relay (27, A) is energized, opening CRA switches 89' and stopping the conveyor motor 88'. This circuit also energizes MM, indexing the master drum 73 to position 6.

MU(2, 6) switch (34, I) closes by a dog at position 6 of the master drum 73, energizing relay CRU (34, A) causing CRU switches 85 to close, starting the hoist motor 86 which raises the hoists H at stations 1, 2, 4, 5, 18 and 19 from their partial down positions to their upper positions. This lifts the barrels B off the conveyor hooks 68 at stations 2, 5 and 19, but not at 22 since there is no hoist at that station. At the top of this upward hoist movement, switch U (34, D) opens, de-energizing CRU relay (34, A) which in turn opens CRU switches 85 to stop the hoists. Also, at the top of hoist travel, U switch (33, F) closes, and since M(2, 6) switch (31, F) is closed by a dog at position 6 of master drum 73, motor MM is energized, indexing the master drum to position 7.

A dog at position 7 of the master drum 73 closes MR(7) switch (36, I), energizing CRR relay (36, A) which in turn closes CRR switches 91 in the conveyor motor circuit, causing the conveyor to reverse until switch R (36, D) opens and switch R (35, E) closes. The R switches (Fig. 5) are so located that they stop the conveyor C when the hooks 68 have cleared the barrels B. Opening switch R (36, D) de-energizes relay CRR (36, A) causing CRR switches 91 in the conveyor motor circuit to open, thereby stopping the conveyor C. Closing R switch (35, E) causes master motor MM (30, A) to be energized since M(7) switch (31, E) is closed by a dog at position 7 of master drum 73. Accordingly, the master drum indexes to position 8.

MD(4, 8) switch (32, J) is closed by a dog at position 8 of the master drum 73, energizing CRD relay (32, A) which in turn closes CRD switches 90 in the hoist motor circuit, causing the hoists H at stations 1, 2, 4, 5, 18 and 19 to lower, depositing the barrels B in the tanks at stations 2, 5 and 19. When the hoists have deposited the barrels B in the tanks T, switch D (32, D) opens and switch D (31, H) closes. Opening switch D (92, D) de-energizes CRD relay (32, A), opening switches CRD 90 thereby stopping the hoist motor 86. Closing switch D (31, H) energizes MM (30, A) since MD(4, 8) switch (32, J) and M8 switch (31, H) are closed by dogs at position 8 of master drum 73. Accordingly, master drum 73 indexes to its position 0 again, ready to start a new series of the eight positions of drums 73.

Referring to Fig. 7, the above operations consumed approximately twelve seconds. The apparatus is then inactive for four minutes after the barrels are deposited in the tanks at stations 2, 5 and 19, at which time the "#1" circuit of timer motor (24, A) is energized, closing the TM1 switch (22, G). Since MS(0) switch (13, I) and MO switch (28, B) are closed by dogs at position 0 of the master drum 73 and switch PT1 is closed by a dog at position 1 of the primary drum 79, motor MM (30, A) is energized, indexing the master drum to position 1. In the same way that the primary drum was indexed to position 1 when the master drum 73 indexed to its position 1 at the beginning of the cycle, the primary drum now indexes to position 2. However, the secondary remains at its position 1 since switch PS1 (16, C) is open.

Referring to Fig. 7, it is seen that a position 2 of the primary, the work-loaded barrel in the tank at station 2 is to be transferred to station 3 and the empty barrels at 5, 19 and 22 are to be transferred to stations 6, 20 and 1, respectively. Accordingly, there are dogs at position 2 of the primary 79 that close switches PS1, PS2, PS3, PS5, PS6, PS19 and PS20. Also, there is a dog closing switch PB3 (28, I) since the master trolley is now at station 2, and the desired transfer distance is that between two adjacent stations. Closing of these switches, except PB3, when the primary is at position 2 and the hoist motor 86 running, energizes the solenoids that engage the hoist clutches for the hoists at stations 1, 2, 3, 5, 6, 19 and 20. Automatically, the master drum 73 indexes successively through its eight positions back to position 0 in the identical manner as described above, causing the loaded barrel at station 2 to be transferred to station 3, and empty barrels at stations 5, 19 and 22 to be transferred to stations 6, 20 and 1, respectively.

Two minutes after these barrels have been deposited at stations 3, 6, 20 and 1 (see Fig. 7), the #2 circuit of timer motor 1 is energized, closing the TM2 switch (22, F) and the setting of the third position of the primary is initiated which involves the transferring of the empty barrel at station 6 to station 7. Again, the master drum 73 indexes to position 1 and the primary drum to position 3, while the secondary remains at position 1. At position 3 of the primary, dogs are located in position to close switch PB4 (28, J) since the master trolley is now at station 3 and the transfer distance is again one station. In the usual way, the master drum indexes through its eight positions back to 0, thereby transferring the empty barrel at station 6 to station 7.

One minute after the barrel is deposited in the tank at station 7, the #3 circuit of timer motor 1 is energized, closing TM3 switch (22, F) and the fourth position of the primary becomes effective which involves the transferring of the full barrel at station 3 to station 4, and the empty one at station 20 to station 21 (Fig. 7). Again, the master drum 73 indexes to position 1 and the primary drum 79 to position 4, while the secondary drum 84 remains at its position 1. At position 4 of the primary, dogs are located in position to close switches PS3, PS4 and PE20. There is no hoist at station 21. A dog is also located at position 4 of the primary 79 in position to close switch PB5 (28, J) since the master trolley is now at station 4. In the usual way, the master drum 73 again indexes through its eight positions back to 0, thereby transferring the full barrel at station 3 to station 4, and the empty barrel at station 20 to station 21 (Fig. 7).

Immediately, the #4 circuit of the timer motor 1 is energized and the master drum begins its cycle, indexing the primary to position 5 which involves the transfer of the empty barrel in the tank at station 17 to station 18. While this involves a single station transfer of the conveyor for position 5 of the primary 79 during its first revolution, position 5 for the next succeeding revolution of the primary 79 involves moving a barrel from station 8 to station 18; and position 5 for each additional revolution of the primary 79 involves a variable extent of conveyor travel (see Fig. 7). Accordingly, it is necessary to employ the secondary drum 84 in conjunction with the primary 79 for this phase of the operating cycle. A dog is located at position 1 of the secondary so that it closes switch S17 (8, F). Since there is only one unit of conveyor movement between stations 17 and 18, a dog is placed at position 1 of the secondary so as to close switch SB6 (27, I) since the master trolley is at station 5. Furthermore, dogs are attached to the primary drum 79 at its position 5 to close switches PS5 (8, F) and PSB (26, J); and a dog is attached to this position closing switch PS18 (7, F) since the 18th tank is to receive the barrel from station 17.

When the master drum 73 indexes to position 2 for the position 5 of the primary 79, the hoists at stations 17 and 18 rise. Continued operation of the master drum 73 to its position 5 is the same as before described. At position 5 of the master for the fifth position of the primary, CRA relay (26, A) is energized because one of the master trolleys on the conveyor closes switch B6 (27, H); switch SB1 (27, I) is closed by a dog at position 1 of the secondary; PSB switch (27, J) is closed by a dog at position 5 of the primary; and switch M5 (28, G) is closed by a dog at position 5 of the master drum. This circuit not only opens CRA switches 89', stopping the conveyor motor 88', but also energizes MM (30, A) indexing the master drum 73 to position 6. The master drum 73 continues through its positions 6, 7 and 8 to 0 as previously described, thereby depositing the barrel from station 17 into the tank at station 18.

Immediately, the #5 circuit of timer motor 1 is energized and the master drum 73 begins its cycle, indexing the primary 79 to position 6 which involves transferring the empty barrel at station 7 to the tank at station 17. At position 1 of the secondary 84, a dog is already located to close the SS 17 switch (the switch for the hoist clutch of station 17) which was used with position 5 of the primary 79. It is again used with position 6 of the primary since the barrel from station 7 is to be transferred to station 17. The primary 79 at position 6 also includes a dog in position to close switch PB5, as will be described later, and dogs in position to close PS7 switch (7, F) and PSB switch (27, J). As the master drum 73 indexes from its position 1 to its position 5, the procedure is as previously described. At position 5 of the master drum 73 for position 6 of the primary drum 79, relay CRA (26, A) is energized through the same circuit established by the fifth position of the master drum 73 for the fifth position of the primary 79. The master drum 73 then continues to index until it reaches its zero position when the barrel at station 7 will have been deposited at station 17.

This barrel B remains at station 17 for 72 minutes, the plating time, after which it is transferred through stations 18 to 22 as described.

A dog at position 6 of the primary 79 also closes switch PCI (13, H) and opens switch PCI (12, J). However, since the primary drum 79 does not index to its position 6 until the master drum 73 is at its position 1, the opening and closing of the PCI switches is ineffective until the master drum 73 again returns to its position 0 at the completion of the operation of the primary's position 6. At this time, opening of PCI (12, J) prevents indexing the master drum 73 to its position 1; and closing of PCI (13, H) energizes PM (15, A) thereby indexing the primary 79 to position 7. Dogs are located at positions 7, 8, 9, 10 and 11 of the primary 79 closing switch PCI (13, H) and holding open PCI switch (12, J). Accordingly, the primary drum 79 continuously indexes to its position 0.

Also at position 7 of the primary drum 79, a dog is located closing switch PRS (29, G) which energizes relay CR—RS (20, A) which opens CR—RS switch (12, E), preventing the operation of the timer clutches 1 and 2, thereby stopping the timer motors 1 and 2 (24, 22, A). At the same time, CR—RS switch (19, G) closes, holding the circuit for relay CR—RS (20, A). When one of the master trolleys 83, 83' arrives at the loading station, it opens switch RS (20, E), de-energizing relay CR—RS (20, A) causing closing of CR—RS switch (12, E) and this re-energizes the timer clutch relays 1 and 2 (13, A; 12, B).

That which has been described involves six revolutions of the master drum 73, each of which is identical, one revolution of the primary drum 79, and only one index of the secondary drum 84. After a predetermined time interval (about one half minute, see Fig. 7), switch TMO (23, G) is closed and the master drum 73 indexes to position 1; the primary 79 indexes to its position 1; and the secondary indexes to its position 2, initiating the second series of operations in the cycle.

This second series of operations of the apparatus is identical with the first, except the fifth position of the primary 79 and second position of the secondary 84 transfer a barrel from station 8 to 18; and the sixth position of the primary 79 transfers a barrel from station 7 to station 8 (see Fig. 7).

The third series of operations is identical with the first two except that the fifth position of the primary 79 and third position of the secondary 84 transfer a barrel from station 9 to 18; and the sixth position of the primary 79 transfers a barrel from station 7 to station 9 (see Fig. 7). The cycle continues such that in each succeeding series of operations, a barrel is transferred at each succeeding fifth position of the primary 79 and next higher position of the secondary 84, respectively, from station 12, 13, 14, 15 and 16 to station 18; and in each succeeding sixth position of the primary 79, from station 7 to stations 12, 13, 14, 15 and 16, respectively.

Although the sixth position of the primary 79 for its first revolution involves transferring the barrel at station 7 to station 17, and the sixth position of the primary for its succeeding revolutions involves transferring the barrel at station 7 to stations 8, 9, 10, 11, etc., successively, yet a master trolley 83 or 83' will always be at station 5 after the completion of the operations at positions 5 and 6 of the primary 79 for each of its revolutions. For example, the master trolley moves from station 5 to station 6 for position 5 of the primary during its first revolution because the barrel at station 17 is moved to station 18. The sixth position of the primary during its first revolution involves moving the barrel from station 7 to station 17, a distance of ten stations. Counting 10 stations having B switches (Fig. 5) from station 6 brings a master trolley to station 5. During the second revolution of the primary 79, position 5 involves transferring the barrel at station 8 to station 18, a space of ten stations. Counting ten stations having B switches from station 5 (Fig. 5) brings a master trolley to station 4. However, the corresponding position 6 of the primary 79 involves moving the barrel from station 7 to station 8, a distance of 1 station. This brings a master trolley to station 5 again. This relation exists because there are half as many B switches as there are stations and two master trolleys. Accordingly, the two variable movements, i. e., those in moving barrels from 17 to 18; 8 to 18; 9 to 18; etc., and 7 to 17; 7 to 8; 7 to 9; 7 to 12; etc., follow the equation $X$ plus $Y=11$, where $X$=variable movement to station 18, and $Y$=variable movement from station 7. So, the movement required for each sixth position of the primary is equal to 11 minus that required for the corresponding fifth position. And, this always brings a master trolley to station 5 from which the next succeeding variable X movement is measured. For this reason, a dog is attached to the primary drum 79 at its sixth position in line with switch PB5. Accordingly, at position 6 of the primary for each of its revolutions, switch PB5 is closed, stopping the conveyor at the correct location to satisfy the cycle of operations.

After eight positions of the secondary 84 have been consumed, the cycle will have been completed involving eight positions of the secondary 84, each of which includes one complete revolution of the primary 79, or twelve positions. Each position of the primary requires nine positions of the master drum 73. Accordingly, the completed cycle involves $8 \times 12 \times 9 = 864$ operations in the illustrated cycle. When the primary 79 completes its revolution for position 8 of the secondary, returning to its position 0, switch PSI (16, C) again closes. At this point the master drum 73 is at position 0 and TMS switch (21, E) closes, energizing timer motors 1 and 2 (24, 22, A), again re-starting the entire cycle by indexing the master drum to position 1, closing MC switch (18, G), whereupon the secondary 84 indexes to its position 9. Functions 9, 10, 11 and 0 of the secondary include dogs which close SCI switch (9, I) which continuously indexes the secondary drum 84 to its position 1 where it remains, as before, inactive until the fifth position of the primary drum 79.

While the previous description relates to the automatic operation of the apparatus, it is capable of semi-automatic as well as manual operation.

Referring to Figs. 4 and 6, with the SA3 switch (40, K) in "Auto" (Fig. 4) and with hand lever 92 (Fig. 6) in the "Semi-auto" position, SA1 switch (29, K) closes and SA1 switch (27, K) opens. Opening SA1 switch (27, K) prevents the apparatus from operating automatically. Also, with lever 92 in "Semi-auto" position, SA4 switch (1, E) closes and SA4 switch (3, E) opens.

For purposes of illustration let it be assumed that it is desired to transfer a barrel semi-automatically from station 3 to station 13, and that the master trolley 83 is at station 4. Switches HS3 and HS13 are closed. Referring to Fig. 5, there are ten stations from 3 to 13. Accordingly, counting ten from HB4 where the master trolley is located shows that switch HB3 (Fig. 6) is to be closed since there are only eleven HB switches.

Closing the "Semi-auto" Start switch (24, J) energizes MM (30, A), indexing master drum 73 to position 1 since a dog at position 0 of drum 73 closes switch MO (28, C). At position 1 of drum 73 a dog closes switch M1 (28, D), indexing said drum to position 2. At position 2, a dog on drum 73 closes MU(2,6) switch 34, J), energizing CRU relay (34, A). This causes the CRU switches 85 to close which energize the hoist motor 86 causing it to rotate in a direction to raise the hoists H. As motor 86 starts rotating, cam 87 turns, closing switch D1 (4, J). Closing switch D1 energizes CR2 relay (2, A) through SA4 switch (1, E). Energizing CR2 relay closes CR2 switch (7, J) as well as holding-switch CR2 (2, E).

Closing CR2 switch (7, J) passes current through the HS3 and HS13 switches causing the clutches 35, 36 for the hoists H at stations 3 and 13 to become engaged, thereby raising the hoists at these stations. There are only two HS switches shown in Fig. 4 for clarity. Actually there are ten HS switches (5, F) in parallel; and eight HS switches (6, F) in parallel.

The master drum 73 then continues to index through its eight positions back to 0 in the usual manner, thereby transferring the barrel at stations 3 to station 13.

Manual control of the apparatus can be effected by moving switch SA3 (40, K) to the dotted line position. By closing the switches HU (33, J) and HD (31, J), select hoists H can be made to raise or lower depending upon the setting of the HS switches on the panel board of Fig. 6. Closing HF switch (38, J) causes forward movement of the endless belt conveyor; and closing HR (35, J) causes rearward movement of the conveyor. Accordingly, it is evident that a barrel at any tank can be moved to another tank under manual control regardless of what is in the remaining tanks. It is only necessary for the operator to release the HF switch when the conveyor is at the desired location. The full up and down movements of the hoists H and the reverse movement of the conveyor C automatically terminate.

Although the various features of the improved material-handling apparatus and control have been shown and described in detail to fully disclose one embodiment of the invention, it will be evident that numerous changes may be made in such details, and certain features may be used without others, without departing from the principles of the invention.

What is claimed is:

1. In a control for an apparatus, the combination of master means including a plurality of portions; means adapted to be pre-set on said portions to cause said apparatus to produce a plurality of functions in sequence; a plurality of succeeding means, each including a plurality of portions; means adapted to be pre-set on said succeeding means portions to vary a function set up on a portion of said master means; electrical switches adapted to be operated by said pre-set means; and an electrical circuit including said switches and other electrical equipment for causing said apparatus to sequentially produce the functions determined by the pre-set condition of said master and succeeding means.

2. In a control for an apparatus, the combination of master means including a plurality of portions; means adapted to be pre-set on said portions to cause said apparatus to produce a plurality of functions in sequence; a plurality of modifying means, each including a plurality of portions; means adapted to be pre-set on said modifying means to vary a function set up on a portion of said master means; means responsive to the completion of each function set up on said master means for rendering effective each succeeding portion thereof; electrical switches adapted to be operated by said pre-set means; means responsive to the completion of all the functions set up on said master means for rendering effective successive portions on the first of said modifying means; and means responsive to the completion of all the functions set up on each of the modifying means to render effective successive portions on each of the succeeding modifying means.

3. In a control for an apparatus, the combination of master means including a plurality of portions; means adapted to be pre-set on said portions to cause said apparatus to produce a plurality of functions in sequence; means for rendering effective each of said portions upon the completion of the operation of the last preceding portion; primary means including a plurality of portions; means adapted to be pre-set on the portions of said primary means to vary a function set up on a portion of said master means; secondary means including a plurality of portions; means adapted to be pre-set on the portions of said secondary means to vary one or more of the variable functions of said primary means; electrical switches adapted to be operated by said pre-set means; and an electrical circuit including said switches and other electrical equipment for causing said apparatus to sequentially produce the function determined by the pre-set condition of said master, primary and secondary means.

4. In a control for an apparatus, the combination of master means including a plurality of portions; means adapted to be pre-set on said portions to cause said apparatus to produce a plurality of functions in sequence; means for rendering effective each of said portions upon the completion of the operation of the last preceding portions; primary means including a plurality of portions; means adapted to be pre-set on the portions of said primary means to vary a function set up on a portion of the master means; secondary means including a plurality of portions; means adapted to be pre-set on the portions of said secondary means to vary one or more of the variable functions set up on the portions of said primary means; tertiary means including a plurality of portions; means adapted to be pre-set on the portions of said tertiary means to vary one or more of the variable functions set up on the portions of said primary or secondary means; electrical switches adapted to be operated by said pre-set means; and an electrical circuit including said switches and other electrical equipment for causing said apparatus to sequentially produce the functions determined by the pre-set condition of said master, primary, secondary and tertiary means.

5. In a control for an apparatus, the combination of master means including a plurality of portions; means adapted to be pre-set on said portions to cause said apparatus to produce a series of operations; means for rendering said portions effective successively upon the completion of the operation set up on the last preceding portion; primary means including a plurality of portions; means adapted to be pre-set on the portions of said primary means to modify one or more operations within the series produced by the successive portions of said master means; means responsive to the completion of the series of operations incident to the setting of the portions of said master means for rendering effective successive of the portions of said primary means; electrical switches adapted to be operated by said pre-set means; and an electrical circuit including said switches and other electrical equipment for causing said apparatus to produce the operations in all the series of operations as set up on said master and primary means.

6. In a control for an apparatus, the combination of master means including a plurality of portions; means adapted to be pre-set on said portions to cause said apparatus to produce a series of operations; means for rendering said portions effective successively upon the completion of the operation set up on the last preceding portion; primary means including a plurality of portions; means adapted to be pre-set on the portions of said primary means to modify one or more operations of the series produced by the setting of the portions of said master means; means responsive to the completion of the series of operations incident to the setting of the portions of said master means for rendering effective successive of the portions of said primary means; secondary means including a plurality of portions; means adapted to be pre-set on the portions of said secondary means to modify one or more of the operations produced by the setting of the portions of said master means and said primary means; means for rendering effective successive of the portions of said secondary means upon the completion of the operations rendered effective by the master means and the primary means; electrical switches adapted to be operated by said pre-set means; and an electrical circuit including said switches and other electrical equipment for causing said apparatus to produce the operations in all the series of operations as set up on said master, primary and secondary means.

7. In a control for an apparatus, the combination of a master drum adapted to be indexed from station to station about its longitudinal axis; a Geneva stop mechanism for indexing said drum; series of holes parallel to the longitudinal axis, and peripherally arranged about said drum for selectively attaching switch-actuating dogs; a plurality of electrical switches adapted selectively to be closed by said dogs as said drum is indexed from station to station to cause said apparatus to produce a plurality of operations in sequence; a plurality of succeeding drums similar to said master drum and adapted to be pre-set to modify one or more operations caused by the setting of a preceding drum; and an electrical circuit including said switches and other electrical equipment for causing said apparatus to produce said operations and modified operations in sequence.

8. In a control for an apparatus, the combination of a master drum; switch-actuating means on said drum to cause said apparatus to produce a plurality of functions in sequence; a plurality of succeeding drums, similar to said master drum, each containing switch-actuating means adapted to modify a function caused by a setting of a preceding drum; electrical switches adapted to be operated by said switch-actuating means; and an electrical circuit including said switches and other electrical equipment for causing said apparatus to produce said functions in sequence, thereby producing a complete series of operations and modified operations.

9. In a control for an apparatus, the combination of master means including a plurality of portions; switch-actuating means on said portions adapted to cause said apparatus to produce a plurality of functions in sequence; a plurality of succeeding means, each including a plurality of portions; switch-actuating means on said succeeding means portions to vary a function set up on a portion of said master means; electrical switches adapted to be operated by said switch-actuating means; and an electrical circuit including said switches and other electrical equipment for causing said apparatus to produce the functions determined by the switch-actuating means on said master and succeeding means.

EDWARD P. BULLARD III.

References Cited in the file of this patent

UNITED STATES PATENTS

| Number | Name | Date |
|---|---|---|
| 1,725,635 | Halvorson | Aug. 20, 1929 |
| 1,781,792 | Rodman | Nov. 18, 1930 |
| 2,059,023 | Parry | Oct. 27, 1936 |
| 2,066,628 | Larson | Jan. 5, 1937 |
| 2,250,507 | Thomas et al. | July 29, 1941 |
| 2,431,618 | Rayburn | Nov. 25, 1947 |